Patented Apr. 28, 1942

2,280,831

UNITED STATES PATENT OFFICE 2,280,831

LOWER ALKYL ETHERS OF VITAMIN B6 AND PROCESS OF PREPARING THE SAME

John C. Keresztesy, Rahway, and Joseph R. Stevens, Plainfield, N. J., assignors to Merck & Co., Inc., Rahway, N. J., a corporation of New Jersey No Drawing. Application December 23, 1938, Serial No. 247,479

14 Claims. (Cl. 260—297)

This invention relates to the lower alkyl ethers or vitamin $B_6$, and to a process of preparing the same.

We have discovered that the lower alkyl ethers of vitamin $B_6$, or the hydrohalides of such ethers, may be obtained, for example, by treating vitamin $B_6$ with a solution of diazo methane to obtain the methyl ether of vitamin $B_6$, from which the hydrohalide of the same may be obtained, if desired. The ethers of the present invention have some vitamin $B_6$ activity, about $\frac{1}{50}$ of that of vitamin $B_6$. They may be used as such, or in the synthesis of vitamin $B_6$ or its related compounds.

The following example illustrates one method of carrying out our invention, but it is to be understood that the example is given by way of illustration and not of limitation.

Example

The vitamin $B_6$ base obtained from 50 mgm. of vitamin $B_6$ hydrochloride is dissolved in 1 cc. methyl alcohol, and added to 25 cc. of an ethereal solution of solution of diazo methane prepared from 2 grams of N-methyl nitroso urethane. The mixture is allowed to stand overnight, the ether is evaporated off, and the oily residue picked up in a small amount of methyl alcohol. The insoluble material that separates is removed by centrifuging, and the solvent evaporated. The oily residue is then dissolved in 0.3 cc. methyl alcohol, and ethyl ether is added until precipitation is complete. This precipitate is removed, and the solvent evaporated. The oily residue contains the methyl ether of vitamin $B_6$, which can be obtained therefrom by distillation in high vacuum, the crystalline product having a melting point of 101–102° C.

Alternatively, the oily residue may be dissolved in 0.2 cc. methyl alcohol, and a small drop of ethyl alcoholic HCl added, followed by ethyl ether. The solution clouds up immediately and rosettes of fine needles separate. The crystals melt at 146–148° C. and give the following analysis:

|  | $OCH_3$ |
|---|---|
| Calc. for $C_9H_{14}O_3NCl$ | 14.1 |
| Found | 13.3 |

Instead of employing the vitamin $B_6$ base as a starting material, as in the above example, it is to be understood that the hydrochloride of vitamin $B_6$ base may be used. Alkyl ethers higher than the methyl ether may also be obtained by a similar process. For example, by replacing the diazo methane with diazo ethane, the ethyl ether is formed. If the purified methylated base is treated with alcoholic hydrobromic acid, the hydrobromide of the said base is obtained.

Other modifications may be made in carrying out the present invention, without departing from the spirit and scope thereof, and we are to be limited only by the appended claims.

We claim:

1. A compound selected from the group consisting of the lower alkyl ethers of vitamin $B_6$, and the hydrohalides of the lower alkyl ethers of vitamin $B_6$.

2. The lower alkyl ethers of vitamin $B_6$.

3. The methyl ether of vitamin $B_6$.

4. The ethyl ether of vitamin $B_6$.

5. The hydrohalides of the lower alkyl ethers of vitamin $B_6$.

6. The hydrochloride of the methyl ether of vitamin $B_6$.

7. The hydrobromide of the methyl ether of vitamin $B_6$.

8. The process comprising reacting a solution of diazomethane and a member selected from the group consisting of vitamin $B_6$ and a hydrohalide of vitamin $B_6$.

9. The process comprising reacting a solution of diazomethane with vitamin $B_6$.

10. The process comprising reacting a solution of diazomethane with the hydrochloride of vitamin $B_6$.

11. The process comprising reacting a solution of a low molecular weight diazo paraffin and a member selected from the group consisting of vitamin $B_6$ and a hydrohalide of vitamin $B_6$.

12. The process comprising reacting a solution of diazo ethane with vitamin $B_6$.

13. The process comprising reacting a solution of diazo ethane with the hydrochloride of vitamin $B_6$.

14. The process comprising reacting an etherial solution of a low molecular weight diazo paraffin with a member selected from the group consisting of vitamin $B_6$ and a hydrohalide of vitamin $B_6$.

JOHN C. KERESZTESY.
JOSEPH R. STEVENS.